United States Patent [19]
Caprara

[11] Patent Number: 5,696,532
[45] Date of Patent: Dec. 9, 1997

[54] METHOD FOR CONTROLLING DEVICES FOR POINTING THE CURSOR ON THE SCREEN OF INTERACTIVE SYSTEMS, AND LOGIC UNIT FOR CARRYING OUT SAID METHOD

[75] Inventor: Mauro Caprara, Bologna, Italy

[73] Assignee: Sintecna S.r.l., Bologna, Italy

[21] Appl. No.: 598,449

[22] Filed: Feb. 8, 1996

[30] Foreign Application Priority Data

Feb. 14, 1995 [IT] Italy ............... B095A0054

[51] Int. Cl.$^6$ ............... G06F 3/033
[52] U.S. Cl. ............... 345/145
[58] Field of Search ............... 345/157, 145, 345/159, 160, 161, 164, 167

[56] References Cited

U.S. PATENT DOCUMENTS

| | | | |
|---|---|---|---|
| 4,922,236 | 5/1990 | Heady | 345/157 |
| 4,935,728 | 6/1990 | Kley | 345/157 |
| 5,261,054 | 11/1993 | Lerner et al. | 345/157 |
| 5,563,269 | 10/1996 | Caprara | 345/160 |

Primary Examiner—Mark R. Powell
Attorney, Agent, or Firm—Guido Modiano; Albert Josif

[57] ABSTRACT

A method for controlling static and quasi-static devices for pointing the cursor on the screen of interactive systems, the method comprising: providing an actuation element having a button and being subject to control actions that have a lateral component; periodically sensing the components of the control action in directions x and y; processing signals corresponding to the components in the directions x and y; calculating the modulus and the direction parameters of the movement; converting the modulus according to a preset conversion rule; storing, at each cycle, the values of the modulus, of the corrected modulus, and of the direction parameters; transferring and restoring the values; feeding the values of the current cycle and the values of the previous cycle, toward elements for calculating components of the incremental movements in directions x and y to be imparted to the cursor; feeding the components to an adder element, and processing signals to be transmitted to the connected interactive system for controlling movements of the cursor matching control actions.

A logic unit is also provided for carrying out the method.

5 Claims, 2 Drawing Sheets

METHOD FOR CONTROLLING DEVICES FOR POINTING THE CURSOR ON THE SCREEN OF INTERACTIVE SYSTEMS, AND LOGIC UNIT FOR CARRYING OUT SAID METHOD

BACKGROUND OF THE INVENTION

The present invention relates to a method for controlling a device for controlling the position of the cursor displayed on the screen of personal computers, workstations, visual display terminals, and of interactive systems in general that communicate with the operator by means of images. The invention furthermore relates to a control logic unit for carrying out said method.

It is known that conventional pointing devices (hereinafter referenced as "pointers" for the sake of brevity) convert the movements of an element (mouse or trackball) operated by the operator into signals to proportionally control the movements of the cursor on the screen.

These devices have the drawback of requiring a maneuvering space and of being bulky; accordingly, they are poorly adapted to be integrated in the systems. Furthermore, as conventional devices comprise moving parts, they are subject to wear and therefore to reliability limitations.

In order to overcome the above-described drawbacks, static pointers, i.e., pointers having no moving parts, have been introduced, such as those proposed in publication EP 433.205 in the name of INTERNATIONAL BUSINESS MACHINES CORPORATION, ARMONK (USA), in international publication WO-A-8906023 (NCR CORP.), in German publication DE-A-3523270 (SIEMENS AG), as well as quasi-static pointers, i.e., pointers characterized by actuation elements having limited movements, such as the one introduced in Italian patent application BO94A000099 and U.S. patent application Ser. No. 08/307,440, and the one introduced in European patent 92909798.8 in the name of Fujitsu.

In particular, in the pointer according to Italian patent application BO94A000099 and U.S. patent application Ser. No. 08/307,440, the control action is applied by the operator on a tilting element that tilts, in proportion to a pressure applied by the operator, in the direction of said pressure.

A sensor is operatively associated with said element and supplies signals that indicate the components of pressure or of inclination in the directions X and Y of a Cartesian reference system.

These signals are periodically analyzed by a control logic unit which, for each cycle, calculates the incremental movement to be applied to the cursor in the direction that corresponds to the tilting direction and with a speed that increases according to the corresponding modulus. An accumulation logic unit accumulates the incremental movements calculated in a plurality of successive cycles and transmits them to the system.

Accordingly, the relation between the applied forces or control actions (hereinafter referenced as AC) and the cursor movements (hereinafter termed SC) is of the integral type; that is to say, the modulus of the AC (for example of the pressure applied to the tilting element) does not directly determine the movements SC but determines the speed at which they are performed.

Integral actuation has some drawbacks:

a) to perform long cursor movements in a short time, it is necessary to raise the speed of the motion to high levels; stopping inaccuracies, however, become excessive in this case. This arises from the presence of delays in the actuation chain, which induce stopping delays and consequent "overshooting" of the intended arrival point, and of limitations to the precision that can be achieved in appreciating the position of the moving cursor, which depend on the refresh frequency of the screen and on the persistence of the image on said screen and in the operator's perception. It has been observed experimentally that in ordinary conditions these errors increase very rapidly above a cursor movement speed threshold on the order of 800 pixels per second, which drops even to lower values in the case of nonuniform movements.

In order to contain this drawback, it is necessary to limit the cursor movement speed, but this penalizes significantly the time required to perform long movements.

b) to perform small and accurate movements, it is instead necessary to use very low movement speeds, down to a few pixels per second.

However, if such low speeds are made available together with the higher ones adapted for long movements, the range of possible speeds becomes so wide (with a ratio of even more than 1:100 between minimum speed and maximum speed) that it is difficult to control: small irregularities in the control action in fact induce significant changes in the cursor movement speed and consequent loss of control or positioning errors.

If however the minimum speed is raised in order to limit the width of the range of speed values, stopping precision decreases and it is in any case difficult to achieve accurate movements.

The above-mentioned drawbacks affect more significantly static pointers, which are characterized by a limited capability of "positive" control of the applied forces AC and therefore essentially depend, in positioning control, on the "feedback" provided by the viewing of said cursor. However, said drawbacks are also perceivable, albeit to a lesser extent, in quasi-static devices such as the one introduced by the above-mentioned patents.

To avoid the above-mentioned drawbacks, the quasi-static pointer by Fujitsu mentioned above uses a control method based on a combination of direct and integral actuation.

The pointer has an actuation element that is shaped like a spherical dome and can be maneuvered in a direction that is tangent to the surface in a manner that is similar to a trackball, but with a stroke range that is limited to a fraction of a turn.

Within this range, the actuations are sensed by a sensor, producing cursor movements that are directly linked, according to one of various proposed vector algorithms, to said actuations. When the limit of the range is reached, an additional sensor is instead activated and triggers integral-type operation.

The control method proposed in the above-mentioned patent, besides being specific for a pointer of the shape being considered, whose operating element does not have an unequivocal and clearly perceived idle position, only partially solves the problem of achieving convenient control ergonomics, since:

the useful stroke of the direct actuation varies according to the initial position of the actuation element and therefore according to the sequence of the previously performed direct positioning actions; therefore, integral positioning might be randomly activated for cursor movements that sometimes are rather large and sometimes very small;

integral actuation occurs at a speed that is preset, although optionally variable during the setting of the parameters of the characteristics of the device; it is therefore the result of a compromise that can penalize long movements in terms of slowness or short ones in terms of inaccuracy.

SUMMARY OF THE INVENTION

The aim of the present invention is to provide a method that allows to overcome the drawbacks mentioned above, improving speed, precision, and comfort in the actuation of static or quasi-static pointers.

Within the scope of this aim, an object of the present invention is to provide a control logic unit that is adapted to carry out said method.

This aim and this object are achieved with a control method and with the corresponding execution by means of a logic unit, whose characteristics are defined in the claims.

BRIEF DESCRIPTION OF THE DRAWINGS

Further advantages and characteristics of the invention will become apparent from the following description with the aid of the accompanying drawings, wherein.

DESCRIPTION OF THE PREFERRED EMBODIMENTS

For better understanding of the invention, the method is first of all described in its stages independently of the structure of the control logic unit, which will be described later on.

The essential aspect of the present method with respect to those of the prior art, for example of the mentioned U.S. patent application Ser. No. 08/307,440, resides in that it controls the cursor on the basis of a coordinated combination of direct and integral actuation, ensuring however both reference to a clearly defined idle position (which static and most quasi-static pointers have and must in any case reach at the end of their operation) and dynamic control of the extent and speed of cursor movements.

Hereinafter, the use is assumed of an actuation element such as the one described in the mentioned patent application No. BO94A000099, which is susceptible (like other previously mentioned devices) of being improved by means of the application of the present invention, and is referenced here in some of its aspects to complete the description of said invention.

Said element comprises a tilting button that has a main axis Z which, in idle conditions, lies at right angles to the plane formed by two perpendicular axes x,y whose origin is O. The control action applied by the user on the button is a force that produces a more or less marked tilting of the main axis Z in the direction that corresponds to the one in which the cursor is to be moved.

Figure 1:
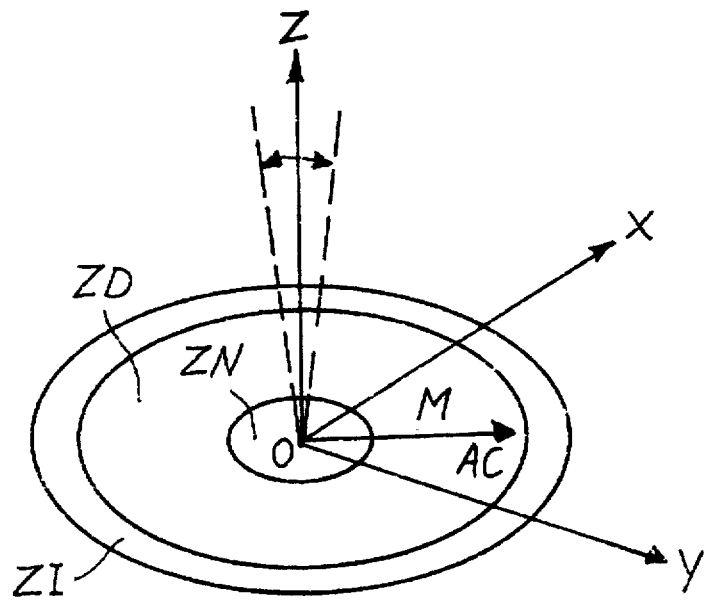
FIG. 1 is a diagram of the intervention range of the control actions AC.

In FIG. 1, AC designates the vector that quantifies, in terms of direction and modulus, the control action AC applied to the actuation element, and ZN, ZD, and ZI designate three regions that are concentric to the origin O and indicate three ranges of values that increase in terms of the modulus M of the vector AC, i.e., of the control action.

The values of M that correspond to the upper limits of the three regions, i.e., the respective external radiuses, are designated by $M_N$, $M_D$, and $M_I$.

It should be noted that in a quasi-static pointer such as the one introduced by the above mentioned patent, the value represented by the vector AC, in addition to corresponding, as mentioned, to the force applied to the actuation button, also corresponds to the angular stroke (tilting) of the button that is achieved in a condition of equilibrium between the applied force and the elastic contrast reaction. In fully static pointers, the AC can always be identified as a force, whereas the extent of the movements, or tilting actions, is not appreciable.

Depending on the region within which the modulus of the action AC falls, the control logic unit determines the movement of the cursor in relation to the rule provided for that region.

Accordingly, in the region ZN (neutral region, in which the modulus M remains within an interval of minimum values), the control action AC produces no cursor movement.

In the region ZD (direct actuation region, in which the modulus M falls within an interval of medium values), an effect of AC is to produce incremental movements of the cursor that are directly linked to the variation and to the rate of variation of the AC.

Finally, once the region ZI is reached (region where integral actuation begins and wherein the modulus M falls within the interval of the maximum values), an "integral" effect of the AC is to produce continuous movements of the cursor in the direction of the AC with a speed that is linked to the intensity and speed of initial application of said AC.

The possibility of an effective "positive" control of the actuation is linked, within ZN and ZD, to the uniform progression of the response to the applied action, which is ensured by a response characteristic that is substantially linear with respect to the applied force and, in quasi-static pointer, by the linearity of the reaction to the deformation of the elastic element, for example a spring, with which the actuation element is associated.

At the border of ZD toward ZI it is instead convenient, as preferred embodiment of the device, for the response to become suddenly nonlinear. In this manner, entry into ZI will be detected in advance, instead of only after a certain delay by virtue of the visual reaction provided by the stroke of the cursor, and will therefore be voluntary. This can be achieved in static pointers by introducing a nonlinear response to the applied force requiring it to be incremented by a pre-determined factor before triggering the integral effect, and in quasi-static pointers by introducing a steep reaction increment that is linked for example to a mechanical design of a spring that entails hardening toward the stroke limit, which can be provided by means of conventional mechanical methods.

If the components of the control action AC are referenced by X and Y, and if M designates the modulus of said action, the method develops as follows.

In each operation cycle of the control logic unit, the components X and Y in the directions x and y of the action AC are sensed and the modulus $M=\sqrt{(X^2+Y^2)}$ is calculated and expressed in conventional steps. Assume, by way of example, that $M_N=7$, $M_D=30$, and $M_I=32$ steps.

As long as the action AC remains in the region ZN (i.e., $M<M_N$), no cursor movement is requested, and any residual accumulation of any prior actuations is systematically reset to zero.

When the action AC reaches the region ZD, incremental movements of the cursor that depend on the evolution of the action AC are calculated and accumulated in a cyclic fashion. A "corrected" modulus N is derived for this purpose from the modulus M and is expressed in steps that are equivalent to a movement of one pixel on the screen, and a homologous vector W, having N as modulus, is derived from the vector AC.

Figure 2:
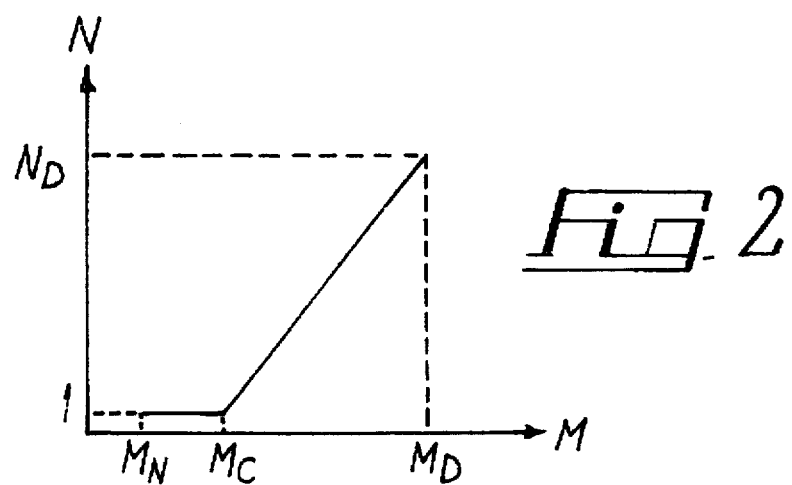
FIG. 2 is a diagram showing the rule for converting the modulus of the control action AC into steps covered by the cursor on the screen during the "direct" actuation step described later.

A conversion rule N=N(M) that is adapted to the purpose is shown by way of indication in FIG. 2.

On the basis of this rule, the value N remains constant and equal to "one" (1 pixel) over a certain extent above the maximum value $M_N$ that corresponds to the modulus of the vector AC that is equal to the radius of the region ZN. For example, the value N=1 can remain for values of M higher than $M_N$ and up to $M_C$ steps (for example with $M_C$=11).

The presence of a constant segment N=1 between $M_N$ and $M_C$ therefore allows to safely perform single-pixel movements or corrections of the cursor position even though the control action is not perfectly constant but varies between $M_N$ and $M_C$. If the control action increases above $M_C$, the corresponding value of N increases up to the value $N_D$ that corresponds to the maximum value $M_D$ of the modulus M that corresponds to the limit of the region ZD.

The shape of the rising ramp can be made as an example linear with a gradient of 1, i.e., of one pixel for each step of the modulus M, as shown in FIG. 2. This shape allows to smoothly perform increasingly large cursor movements up to the maximum value of pixels that corresponds to $N_D$. Therefore, with the previously provided values:

$$N_D=M_D+M_C+1=30-11+1=20\ pixels.$$

is obtained.

It should be noted that with the method according to the present invention, the incremental movements of the cursor are determined at each cycle with a rule that does not cause the cursor to return toward the initial position when the modulus M of the AC decreases.

Figure 3:
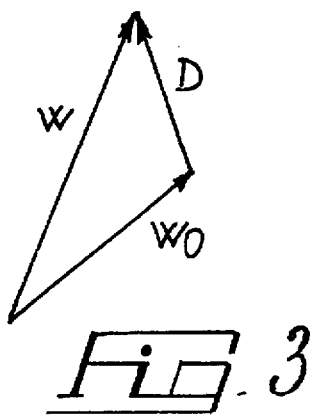
FIGS. 3 and 4 are diagrams of the action AC and of the corresponding conversion into incremental movements of the cursor.
Figure 4:
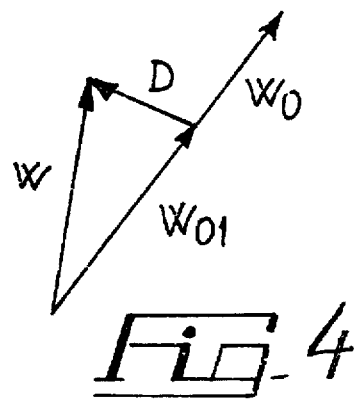

On the basis of this rule, if $W_0$ (having modulus $N_0$) is the vector W stored in the cycle that preceded the current cycle, and if W is the current vector, the incremental movement of the cursor is determined, if M is greater than or equal to $M_0$, as the vector difference D between W and $W_0$ (FIG. 3). If instead the modulus M is smaller than $M_0$, the vector difference is preceded by a "compression" of the vector $W_0$ to the vector $W_{01}$ that has the same direction and a modulus equal to N (FIG. 4). As a more simply executable alternative, D can be simply set to zero in the same situation.

Both methods allow to continuously modify the direction in which the cursor moves, but at the same time they prevent the return of the cursor to the initial position when the control action AC decreases in intensity, i.e., when the actuation button is gradually or fully released.

To conclude, by pressing the button in a certain direction, the cursor is moved in the corresponding direction over a distance that is modulated according to the extent of the control action AC. Advancement stops if the button is stopped in the position thus reached or if one starts to release it. Said advancement can be resumed by increasing the pressure on the button again.

If one wishes to move the cursor further in a direction that is identical, different, or even opposite to the initial one, it is simply necessary to press the button again in the desired direction.

As a further particularity of the method according to the invention, the possibility is provided of controlling the movement of the cursor as a function not only of said control action, but also of its speed, so as to quicken and extend the incremental movements of the cursor. This simplification arises from the application, within the scope of the described method, during the direct actuation stage, of a "dynamic" amplification method that is already known for conventional pointers.

For this purpose, the incremental movement vector D is modified at each cycle, before being used, according to the actuation speed of the button, from the radial component of which a factor V, which corresponds to the "floating average" of the variation rate of M, is derived.

The expression for calculating the floating average in each cycle can be of the following type:

$$V=V_0\cdot(1-C/T)+(M-M_0)\cdot K\cdot C/T \qquad (1)$$

followed by a limitation to the values of V that lie between "one" and $V_M$ (for example $V_M$=3).

In (1), the symbols have the following meanings: $V_0$ is the value of V stored in the cycle that preceded the current one; C/T is the ratio between the processing cycle C and an appropriate time constant (for example, on the order of fifteen milliseconds); $M_0$ is the value of the modulus M of the action AC that was stored in the previous cycle; K is a factor chosen so as to make V assume, in the steady state and for time-constant evolutions of M, values between $V_M$ for fast actuations (i.e., actuations performed in times shorter than T) and "one" for slow actuations (i.e., actuations performed in times longer than $V_M \cdot T$).

The effect of the multiplication of D by V is an amplification of the cursor movements SC in case of quick actuations. It extends the range of the cursor movements SC that can be obtained in direct actuation without increasing the sensitivity of the control chain in the case of slow actuations, and therefore without penalizing the precision of accurate positionings.

When the control action AC, after exceeding the limit $M_0$ of the region ZD, enters the region ZI, operation becomes of the integral type, i.e., in each cycle the cursor performs an incremental movement SC in the direction that corresponds to AC at a speed that is proportional to a speed factor Q that is determined on the basis of the factor V mentioned above, stored with the value that is has reached when transit through the region ZD ends.

The correspondence rule Q=Q(V) between V and Q is chosen so as to ensure an operation that can be controlled easily and intuitively by the operator.

For this purpose, a behavior of the function Q(V) that gradually increases between a minimum practically useful speed (which is reached if V=1) and a maximum practically controllable speed (which is reached if $V=V_M$) is convenient. In practice, it is possible to use a simple linear function of the following type:

$$Q=Q_1+(Q_2-Q_1)\cdot(V-1)/(V_M-1) \qquad (2)$$

which can vary between the limits $Q_1$ and $Q_2$ as V varies between 1 and $V_M$.

Q1 can be made as low as "zero" if the integral action is not triggered, then the direct mode is kept on.

The speed of the integral motion can be further modulated according to the current value of M.

In the simplest embodiment, the speed can be fully eliminated as M decreases to $M_D$ or less, to make "braking" of the cursor motion faster, thus reducing the risk of overshooting the intended destination of the cursor; in this case, one immediately returns to the direct actuation region ZD.

As a preferential alternative, it is instead possible to perform a gradual reduction of the speed, making it proportional not only to Q but also to M, so as to make its modulation become gradual, and continuing the integral motion during the return transit through the region ZD, fully eliminating it only when reentering the region ZN.

Various speed ranges become accessible by combining the effect of the factors Q and M.

The highest speed is used to provide quick and coarse cursor movements at speeds that are comprised, by way of example, between 600 and 150 pixels per second (at the variation of M, with the above exemplified values, from $M_f=32$ to $M_N+1=8$). This speed range is selected by starting the actuation with a quick full-stroke push of the actuation button that causes the complete crossing of the ZD in no more than T milliseconds.

The lowest ranges can go down to "zero" speed, and immediately above can allow slow and accurate movements of the cursor at speeds between 100 and 25 pixels per second. They are selected by starting the actuation with a full-stroke push of the button lasting no less than $V_M \cdot T$, or respectively slightly more than the same value.

All the intermediate ranges are of course also possible.

In intuitive terms, the faster the initial action AC, i.e., the crossing of the region ZD, the higher the speed at which the cursor subsequently moves in the ZI; the cursor will therefore behave as if it had been "propelled" by the initial action AC. The movement of the cursor, once started, can be slowed or stopped by reducing the action AC.

Figure 5:
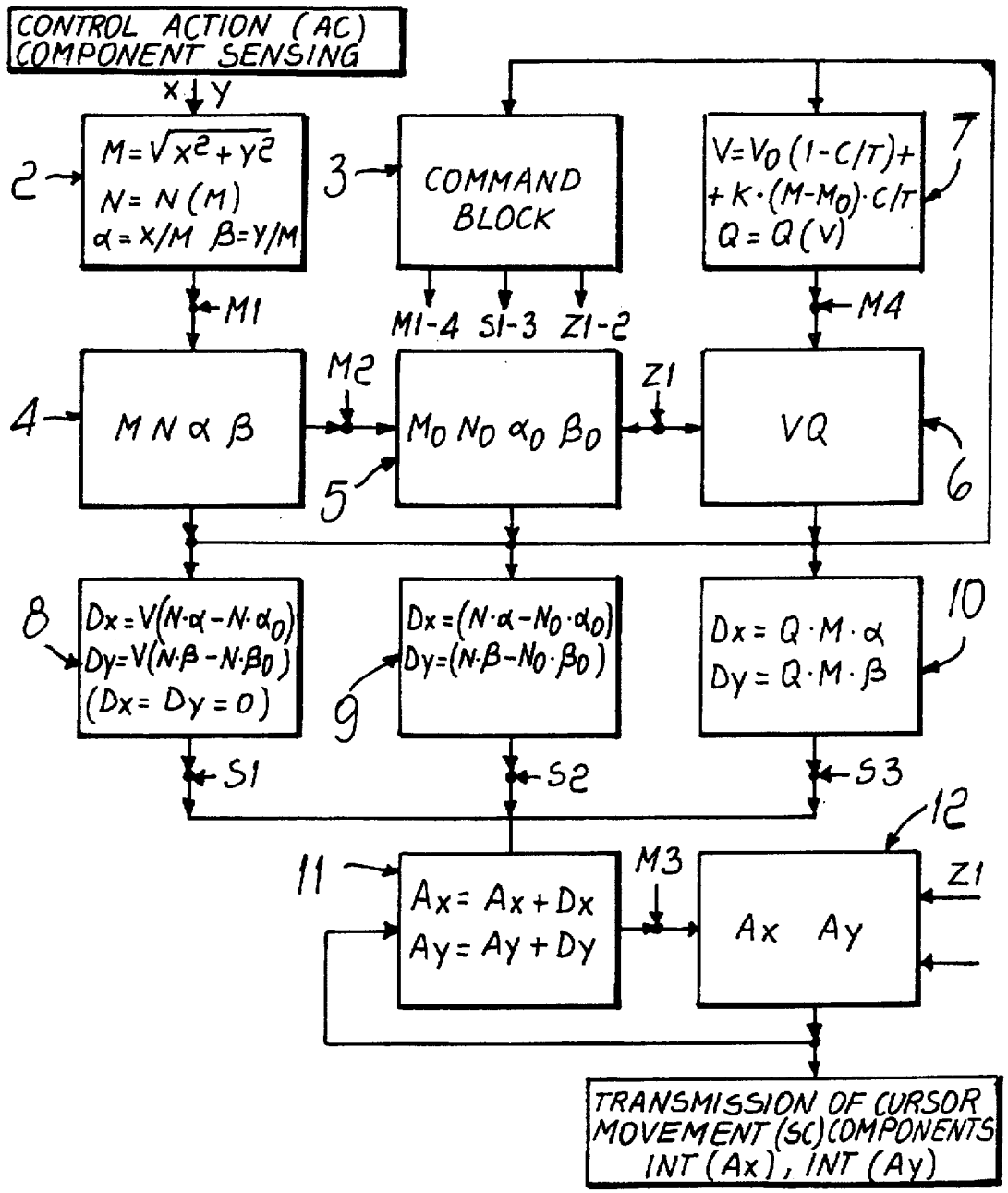
FIG. 5 is a block diagram of the control logic unit.

The control logic unit for executing the described method is provided for example according to the block diagram of FIG. 5.

The reference numeral 1 designates a block that detects, at each cycle, the components X, Y of the action AC and transmits them to a computing block 2, which calculates the modulus $M=\sqrt{(X^2+Y^2)}$, the corrected modulus N(M), and the direction cosines $\alpha=X/M$ and $\beta=Y/M$ of the components X, Y.

The amounts M, N, $\alpha$, $\beta$ processed on the command $M_1$ issued at the beginning of each cycle by the command block 3 are stored in a register 4. Following a further command $M_2$ issued at the end of each cycle by the command block 3, the values already contained in the register 2 are transferred and stored in a second register 5 to be then used as values $M_0$, $N_0$, $\alpha_0$, $\beta_0$ to be compared with the new values M,N,$\alpha$,$\beta$ of the subsequent cycle.

A register 6 interacts with the block 5, and the updated values processed by the block 7, i.e. the updated value of the "floating average" V and of the speed factor Q, calculated according to the above given formulas, are stored in said register.

Storing in the register 6 is requested with the command $M_4$ by the block 3 at each direct actuation cycle, whereas it remains unchanged during integral actuation and is reset, in the cycles performed in the region ZN, with the command $Z_1$ that originates from the block 3 and is also directed to the block 2.

The value of the cycle in progress, stored in the register 4, and those of the previous cycle, stored in the registers 5 and 6, are supplied to the blocks 8, 9, and 10, which process the incremental movement components $D_x$, dy respectively as:

a) components of the difference between the vector W and the vector $W_{01}$ based on the modulus N, i.e., $D_x=N\cdot\alpha-N\cdot\alpha_0$ and $D_y=N\cdot\beta-N\cdot\beta_0$, in the block 8; as an alternative, as mentioned, it is possible to set $D_x=D_y=0$ in a simplified form;

b) components of the difference between the vector W and the vector $W_0$, i.e., $D_x=N\cdot\alpha-N_0\cdot\alpha_0$ and $D_y=N\cdot\beta-N_0\cdot\beta_0$ in the block 9;

c) components of the movement performed in the time C of one cycle at the speed determined by the factor Q and by the components X and Y of the action AC, i.e., $D_x=Q\cdot M\cdot\alpha$ and $D_y=Q\cdot M\cdot\alpha$ in the block 10.

The values at the output of the blocks 8, 9, and 10 are selected individually with the commands $S_1$, $S_2$, $S_3$ on the basis of the value of the modulus M in relation to the value of the modulus $M_0$ of the previous cycle. The block 3 issues:

a) the command $S_1$ in case of direct actuation if $M<M_0$;

b) the command $S_2$ in case of direct actuation if $M \geq M_0$;

c) the command $S_3$ in case of integral actuation.

The values at the output of the blocks 8, 9, and 10 are sent to an adder block 11 that produces the algebraic sum of the components of the incremental movements $D_x$,$D_y$ and of the movements previously accumulated in the respective accumulators $A_x$,$A_y$ in the register 12 during previous cycles; the accumulation affects all the incremental movements that occur between two successive transmissions to the connected system.

By means of the command $M_3$, the result in the adder 11 is stored as new content in the register 12, except for the case of the cycles in which the action AC falls within the neutral region ZN, so that the register 12 is reset with the command $Z_1$.

To ensure sufficient computing precision and consequent smoothness of the movements, the representations of the previous amounts $D_x$,$D_y$,$A_x$,$A_y$ include a fractional part in addition to the part that expresses whole-pixel movements.

At the end of each cycle, if the line for transmission toward the connected system is free and the integer part of $A_x$ or of $A_y$ is different from zero, the transmission of both of said integer parts INT.($A_x$) and INT.($A_y$) is started; the corresponding parts of the accumulators $A_x$ and $A_y$ are selectively reset with the command $Z_2$ issued by the command block 3, whereas the fractional parts are maintained.

The described logic unit can be provided by means of circuit blocks having the described functions or by virtue of the execution of equivalent functions on the part of the program of a control microprocessor. To be precise, the registers of the blocks 4, 5, 6, and 12 are replaced, in this case, with memory areas, the functions of the processing blocks 2, 7, 8, 9, 10, and 11 are replaced with sequences of processing instructions in the program, and the command block 3, together with the streams of information provided by the commands $M_{1-4}$, $Z_{1-2}$, $S_{1-3}$, are replaced by sequences of control and transfer instructions in the program of the microprocessor.

It is evident that the described logic unit allows to achieve the intended aim and objects. In particular:

a) the cursor movements SC can be controlled not only by means of the intensity of the control action AC and of its duration, as occurs in the case of pure integral operation, but also by means of the initial speed of the action AC, which is easily controllable in an instinctive manner;

b) fine movements can be performed directly, and their precision therefore does not require a reduction of the minimum speed levels of integral actuation. Accordingly, an integral movement speed range that is particularly wide and therefore difficult to control is not necessary;

c) the choice of the speed of the integral actuation, within the range of possible values, is furthermore linked to two independent factors instead of one. The interval of the initial speed values is in fact contained within a limited range (within a ratio of one to six with the numerical values provided as example) that is modulated by the speed of the initial action AC and in a different and also limited range (within a ratio of one to four, with the numeric values mentioned by way of example) during the execution of a given positioning operation whose speed is modulated by the intensity, or modulus, of the action AC. In this manner, control criticality is reduced substantially.

The invention is of course susceptible of numerous modifications and variations, all of which are within the scope of the same inventive concept.

What is claimed is:

1. A method for controlling static and quasi static devices for pointing a cursor on a screen of interactive systems, the method comprising the steps of:

periodically sensing, in directions x and y related to a reference system of perpendicular coordinates, the components of a control action performed to drive an actuation element adapted to point a cursor on a screen of an interactive system;

processing signals corresponding to said components in the directions x and y;

calculating the modulus and the direction parameters of the movement;

converting said modulus according to a preset conversion rule, such as to obtain a corrected modulus on the basis of the value of said modulus;

storing, at each cycle, the values of said modulus, of said corrected modulus, and of said direction parameters in a first memory element;

transferring and storing said values in a second memory element;

feeding the values of the current cycle and the values of the previous cycle, stored in said memory elements, towards elements that are adapted to calculate, according to a specified rule, the components of the incremental movements in the directions x and y to be imparted to the cursor;

feeding said components to an adder element to perform the sum of the incremental movements in the directions x and y and of those accumulated in previous cycles in a third memory element, and processing signals to be transmitted to the connected interactive system so as to control the movements of the cursor so as to match the control action; wherein said conversion rule is such that for small control actions included in a region in the vicinity of the idle position, the corrected modulus is zero, whereas for control actions included in a region that is directly peripheral to said neighboring region, the corrected modulus is constant for a first internal interval and increases about proportionally, as long as the modulus of the control action keeps increasing, to the control action over a second external interval of said peripheral region, and wherein said incremental movements are calculated proportionally to the vector variation of said control action.

2. A method according to claim 1, wherein while the control action falls within said peripheral range, incremental movements that are proportional to the vector variation of the control action with corrected modulus are calculated if the control action has a constant or increasing modulus, and incremental shifts that are proportional to the vector variation of the control action calculated with a constant modulus, or nil ones as an alternative, are calculated if the control action has a decreasing modulus, so as to avoid causing, upon a decreasing action, the return of the cursor to the initial position, and wherein the calculated incremental movements are further multiplied by a factor that is derived from the variation rate of the modulus of the control action, calculated as a floating average, and stored in a cyclic manner in a fourth memory element while the control action falls within said peripheral region.

3. A method according to claim 2, wherein from the moment when the modulus of the control action exceeds the limit of said peripheral region and while it falls within said region bordering the idle position, or as an alternative it returns within said peripheral region, and while the speed factor derived from the variation rate of the modulus exceess a predetermined level, incremental movements of the cursor that correspond to a movement speed that depends on said factor derived from the variation rate of the modulus of the control action and stored in said peripheral region are calculated, and the calculated incremental movements are further multiplied by a factor that is proportional to the current actual modulus of the control action.

4. A control logic for controlling static and quasi-static devices for pointing the cursor on the screen of interactive systems, comprising:

a manual actuation element of the type that has a tilting button or a static button and is in any case subject to control actions that have a lateral component;

means for sensing, in a cyclic manner, the components of the control action in the directions x and y related to a reference system of perpendicular coordinates and for providing signals that correspond to said components in the directions x and y;

elements for processing said signals, for calculating the modulus and the direction parameters of the control action, and for converting said modulus according to a preset conversion rule, so as to obtain a modulus that is corrected on the basis of the value of said modulus;

a first element for storing the values of said modulus, of said corrected modulus, and of said direction parameters;

a second element for storing the values that are stored in said first register and are transferred thereto at each cycle;

an element for calculating a factor that indicates the variation rate of the modulus of the movement, and a fourth memory element for storing the values of said speed factor calculated by said calculation element;

calculating elements that are supplied with the values of the current cycle and with the values of the current cycle, the values of the previous cycle and the variation rate of the modulus, which are stored in said memory elements, and are adapted to calculate, according to a specific rule, the components of the incremental movements in the directions x and y to be imparted to the cursor;

means for selecting, in a cyclic manner, the values at the output of said blocks according to the current value of the control action modulus, to that of the previous cycle and to the variation rate of the modulus;

an adder element for performing the incremental sum of the values of the movements in the directions x and y and of those accumulated in previous cycles;

a third memory element for storing said sum; and means for processing and transmitting to the connected interactive system signals that are suitable to cause the execution of the movement accumulated by the cursor.

5. A control logic unit according to claim 4, wherein said calculation element is adapted to calculate a speed factor modulated by the actuation speed of the button for values of the control action modulus and of its variation rate that lie outside preset ranges.

* * * * *